United States Patent [19]
McWilliams

[11] 3,782,566
[45] Jan. 1, 1974

[54] NUTTING TRUCK UNLOADING ARRANGEMENT FOR MAIL BAG LOADING APPARATUS

[76] Inventor: Joseph E. McWilliams, 1345 Canterbury Ln., Glenview, Ill. 60025

[22] Filed: Nov. 10, 1972

[21] Appl. No.: 305,564

[52] U.S. Cl............... 214/41, 214/46, 214/52 R, 214/55, 214/57, 214/310, 214/314, 214/315
[51] Int. Cl............................................. B65g 67/08
[58] Field of Search................. 214/41, 44, 44 A, 214/57, 52 R, 55, 46, 310, 314, 315

[56] References Cited
UNITED STATES PATENTS
2,150,211  3/1939  Edwards ........................... 214/41 X
3,717,270  2/1973  Rooke et al. ..................... 214/314 X Primary Examiner—Robert G. Sheridan
Attorney—Robert C. Brown, Jr. et al.

[57] ABSTRACT

A nutting truck unloading arrangement for mail bag handling apparatus of the type comprising an elongated wheeled conveyor assembly adapted to be moved between the loading dock and the vehicle being loaded to load bagged mail into the vehicle, in which the nutting truck unloading arrangement comprises a platform secured to the rearward end of said assembly for swinging movement about a horizontal axis from a nutting truck receiving position, adjacent the level of wheel support of the conveyor assembly, and an upwardly directed position, a load discharging arrangement operably associated with the platform for discharging the truck load onto the rearward end of the conveyor assembly, and means for releasably securing the nutting truck against tilting movement relative to the platform during discharge of its load.

6 Claims, 11 Drawing Figures

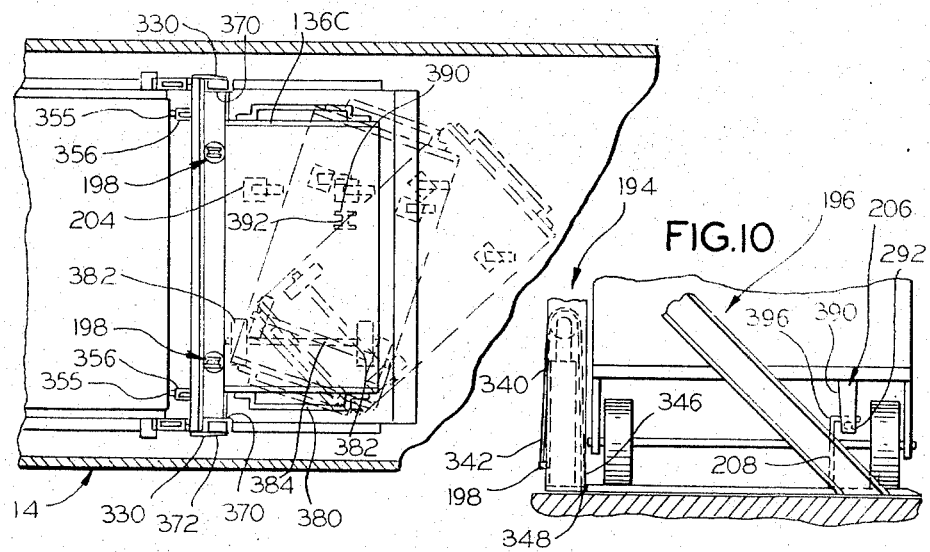
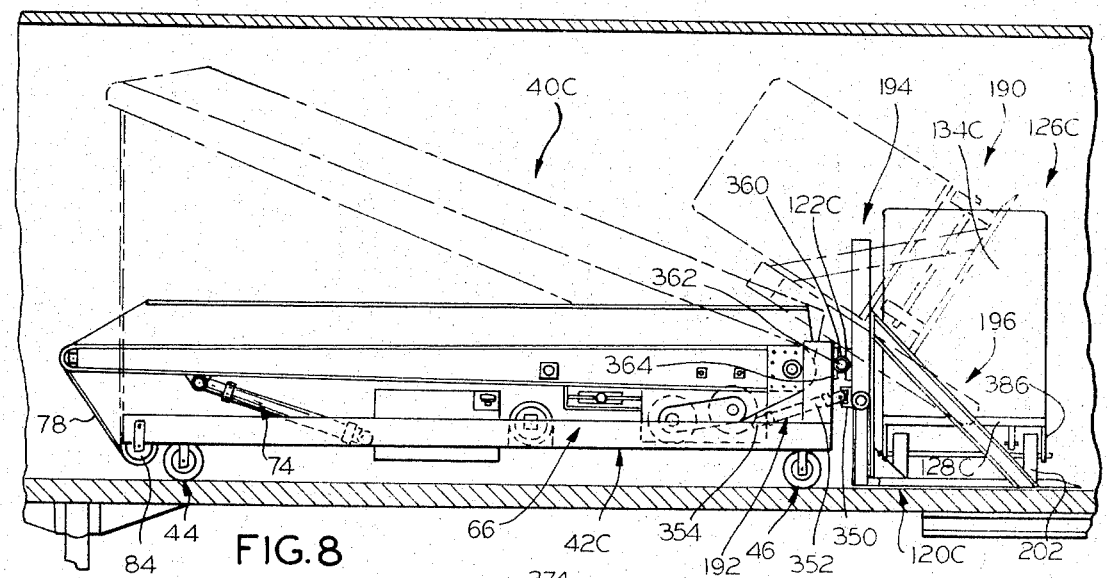
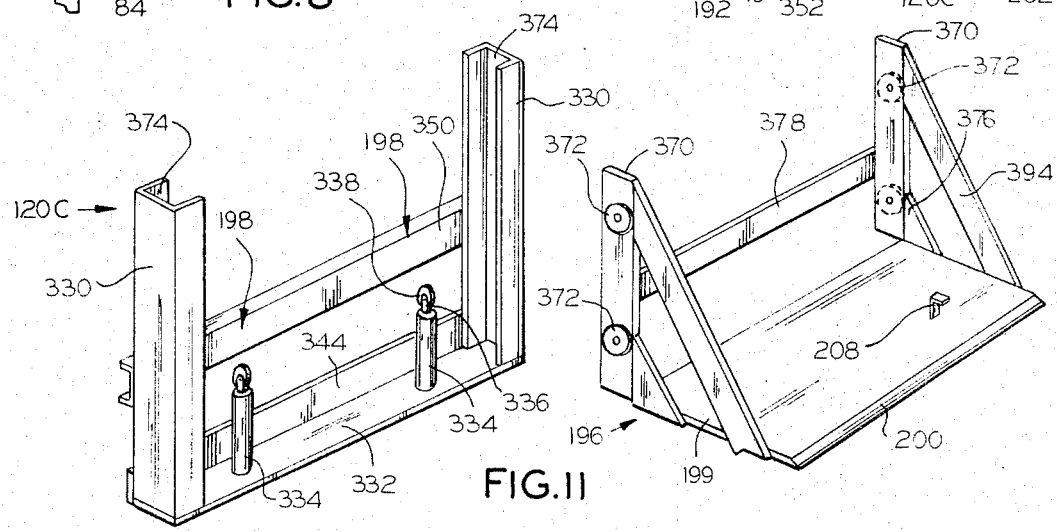

NUTTING TRUCK UNLOADING ARRANGEMENT FOR MAIL BAG LOADING APPARATUS

This invention relates to an apparatus for handling bagged mail, and more particularly, to apparatus for unlaoding nutting trucks onto mail bag loading apparatus of the type disclosed in my application Ser. No. 275,790, filed July 27, 1972.

Said application discloses an arrangement for loading of bagged mail from a loading truck into an end loading highway vehicle in which a wheeled frame is provided with an upright support on which is mounted a forward conveyor section for swinging movement about a horizontal axis adjacent its rearward end for elevational distibution of the mail bags, that carries a high speed bag propelling belt conveyor. Associated with the wheeled frame is a second conveyor section having its forward end approximating the elevation of the rearward end of the first conveyor section, and in load transferring relation thereto, and having its rearward end at an elevation for convenient manual loading of bags thereon. The second conveyor section includes a belt conveyor operating at a lower speed for conveying mail bags received thereon to the high speed propelling conveyor. Both conveyor sections have dimensions transversely thereof that substantially span the transverse dimension of the vehicle loading area.

Apparatus of tis type is capable of receiving and loading mail bag loads in nutting truck load quantities, but so far as the Applicant is aware, the prior art does not provide adequate ways of en mass unloading part or all of a nutting truck mail bag onto a conveyor assembly of this type.

A principal object of this invention is to provide an arrangement for mechanical unloading of nutting truck loads onto the rearward end of the mail bag loading conveyor, directly from the nutting truck, and in an en mass manner for either part or all of the load, whereby manual transfer of the bags from the truck to the conveyor is avoided.

Another important object of the invention is to provide apparatus for unloading nutting trucks directly onto the conveyor apparatus that is to stack the mail bags in the highway vehicle in an en mass fashion.

Other objects of the invention are to provide an improved nutting truck arrangement especially suited for en mass unloading of mail bags therefrom, and to provide mail bag handling apparatus that is economical of manufacture, convenient in use, and long lived in operation.

In accordance with this invention, mail bag loading apparatus of the type described in my said application is equipped with a platform secured to the rearward end of the conveyor assembly for swinging movement about a horizontal axis from a nutting truck receiving position, adjacent the level of the wheel support of the conveyor assembly, to an upwardly directed position. A load discharging arrangement is operably associated with the platform for discharging the truck load onto the rear end of the conveyor in en mass or partial en mass fashion, and the truck and platform are provided with interengaging means to secure the nutting truck against tilting action relative to the platform during discharge of its load.

In one general form of the invention, the load discharge arrangement comprises hydraulic piston and cylinder power assemblies operably interposed between the conveyor assembly and the platform to swing the platform, to which a loaded nutting truck has been applied, to its load discharging position. In another general form of the invention, the platform is equipped with hydraulic piston and cylinder power devices which operably engage between the platform and the supporting surface for the conveyor assembly to achieve the same end.

Yet still another form of the invention, the platform is equipped with a vertically movable pusher plate assembly including an actuator therefor whereby the pusher plate may be positioned vertically relative to a loaded nutting truck disposed on the platform for pushing one or more tiers of bags on the truck forwardly of same and off and onto the rearward end of the conveyor.

Other objects, uses, and advantages will become obvious or be apparent from a consideration of the following detailed description and the application drawings.

In the drawings:

FIG. 8 illustrates a simplified and shorter form of mail bag loading apparatus equipped with an alternate form of nutting truck discharge apparatus in accordance with this invention;

FIG. 9 is a fragmental plan view of the nutting truck discharge device of FIG. 8 and associated structures;

FIG. 10 is a fragmental view illustrating on a larger scale certain details of the nutting truck discharge arrangement of FIGS. 8 and 9; and FIG. 11 is an exploded perspective view illustrating the basic components of the nutting truck unloading arrangement of FIGS. 8 – 10.

However, it is to be distinctly understood that the specific drawing illustrations provided are supplied primarily to comply with the requirements of the patent laws, and that the invention is susceptible of other embodiments that will be obvious to those skilled in the art, and which were intended to be covered by the appended claims.

GENERAL DESCRIPTION

Figure 1:
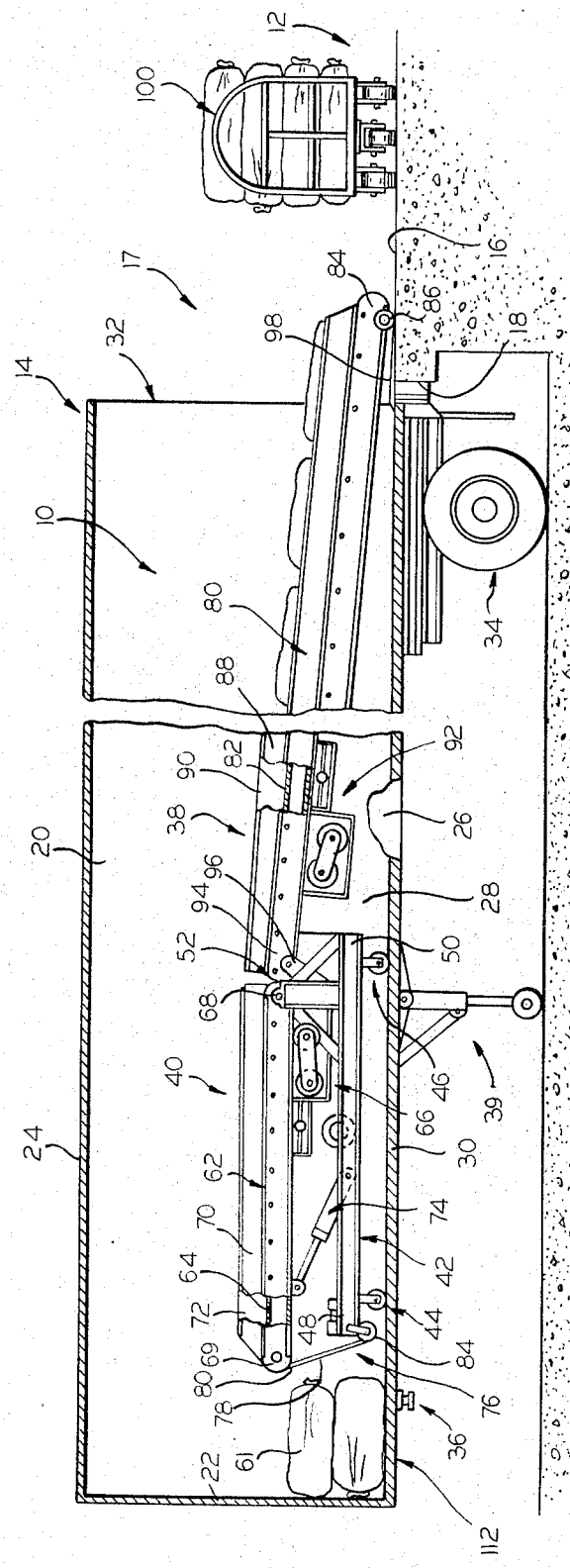
FIG. 1 is a longitudinal vertical sectional view through a highway vehicle being loaded with one of the conveyor assemblies disclosed in my said application, showing same in a largely diagrammatic manner and as served by a conventional nutting truck.

Reference numeral 10 of FIG. 1 generally indicates one embodiment of the mail bag loading apparatus disclosed in my said application (see FIG. 8 of that application) for loading mail bags from a loading dock 12 into an end loading highway vehicle 14, which vehicle has been illustrated as being in the form of the familiar semi-trailer, although the invention of said application is readily applicable to any end loading vehicle proportioned to receive the apparatus 10.

It is assumed that the mail bag handling installation involved includes the loading dock 12 (of a post office or the like), that is conveniently provided with the level load support surface 16, and the usual shoulder end 18 to which the vehicle is backed up at a base 17 for purposes of being loaded.

It is also assumed that the vehicle 14 is in the form of the usual body 20 defined by forward end wall 22, top wall 24, side walls 26 and 28, floor 30, and end opening 32 that is customarily closed by suitable doors or the like (not shown). Body 20, being of the semi-trailer type, rides on the usual rear wheels 34 and is provided with the usual kingpin 36 for connection to the fifth wheel of a conventional tractor truck (not shown). When disconnected from the tractor truck, the vehicle rests on suitable retractable prop 39 adjacent its forward end.

As described in said application, the apparatus 10 comprises a mail bag feeding conveyor 38 and a mial bag propelling positioning conveyor 40. The conveyor 40 is mounted on wheeled frame 42 riding on suitably hydraulically driven wheels 44 and 46 at the respective ends 48 and 50 of the wheeled frame 42.

The wheeled frame 42 is provided with an upright support structure 52, with the conveyor 40 comprising a suitable frame 62 over which high speed propelling belt 64 is trained which is driven by a suitable power drive 66. Frame 66 is mounted in its rear end on the support structure 52 for swinging movement about horizontal axis 68 and has secured to either side of same guide plates 70 and 72 for guiding mail bags being conveyed by the belt 64. Frame 62 is supported by one or more power operated extensible and contractible prop devices 74 which operate to shift the forward end 69 of the frame 62 vertically to move the frame between upwardly and downwardly inclined operating positions, about axis 68, for vertically positioning bags 61 to be discharged into the loading position in the vehicle 14.

Operably interconnected between the forward end 69 and the frame 62 and the forward end 48 of wheeled frame 42 is a roll up type bag damming or restraining baffle device 76, which comprises a flexible sheet 78 that may be in the form of belting or the like, having its end 80 suitably secured to the frame 62, and its other end anchored to roller 84 that is suitably journaled on frame 42 and driven by a suitable hydraulic motor (not shown). As disclosed in said application, the drive arrangement for roller 84 is such that a constant torque of low value is applied to the roller 84 in the direction that will wind up sheet 78 if no restraint to wind up is placed on the sheet 78, but which will permit unwinding of the sheet from the roller 84 as the frame 62 moves from a downwardly inclined position to an upwardly inclined position. Thus, as the frame 62 moves from an upwardly inclined position to a downwardly inclined position, the sheet 78 is automatically wound up on the roller 84. The drive for the roller 84 also maintains sufficient tension on the sheets 78 so that it serves as a dam restraining means to prevent rebound of mail bags rearwardly of the forward end 48 of the frame 42 as the bags are being loaded into the vehicle 14.

The feeding conveyor 38 comprises a frame 80 over which conveyor belt 82 is trained, and which at its rearward end 84 rides on suitable rear wheels 86. Conveyor 38 is equipped with spaced side guide members 88 and 90 to insure that the bags remain on the conveyor belt 82 as they are transported thereby. Conveyor belt 82 is driven by suitable power drive apparatus 92. The forward end 94 of the conveyor 38 is mounted between spaced support arms 96 that are suitably affixed to the wheeled frame 42.

Conveyors 38 and 40 have a width to substantially span the transverse dimension of the vehicle body 20 when received in same. Conveyors 38 and 40 have their adjacent ends closely spaced for ready transfer therebetween of mail bags 61, and the conveyor belts 64 and 82 are of the full width type in that they extend substantially the transverse dimension of the body 20 within the confines of the respective conveyors 38 and 40.

When the vehicle 14 is positioned at the loading bay 17 in a manner indicated in FIG. 1 for being loaded with mail bags 61, the apparatus 10 is moved from the loading dock into the highway vehicle by operating the power wheels 44 and 46, suitable bridge plate 98 being employed to facilitate transfer of the apparatus 10 between the loading dock and the vehicle. For purposes of loading the mail bags into the vehicle 14, conveyors 38 and 40 are put into operation, the belt 82 being driven at a speed of about 200 feet per minute while the belt 64 being driven at a speed of about 550 feet per minute. Assuming that the vehicle is empty, the operator moves the apparatus 10 to the forward position indicated in FIG. 1 for piling the bags in the stack 112. Prior to this invention, where the facility contemplates that the bags will be loaded into conventional nutting trucks, for conveyance to the site of the apparatus 10, such nutting trucks, one of which is indicated at 100 in FIG. 1, are unloaded by hand onto the conveyor 38. As the bags 61 move across conveyors 38 and 40, the conveyor 40 is angled vertically by operation of suitable push button controls (not shown) by the operator to aim the bag being discharged from the conveyor 40 to its desired position in the stack 112. As the stack is built up, the angulation of the conveyor 40 moves upwardly until the stack 112 is completed, whereupon the apparatus 10 is moved rearwardly for forming another stack in like manner.

Needless to say, the full width conveyor apparatus 10 is capable of handling the bags in greater number than can be supplied manually from the conventional nutting truck 100, and for this purpose the nutting truck unloading arrangements of FIGS. 2 – 11 have been provided to achieve en mass unloading of the nutting trucks directly onto the rearward end of the conveyor 38.

Figure 3:
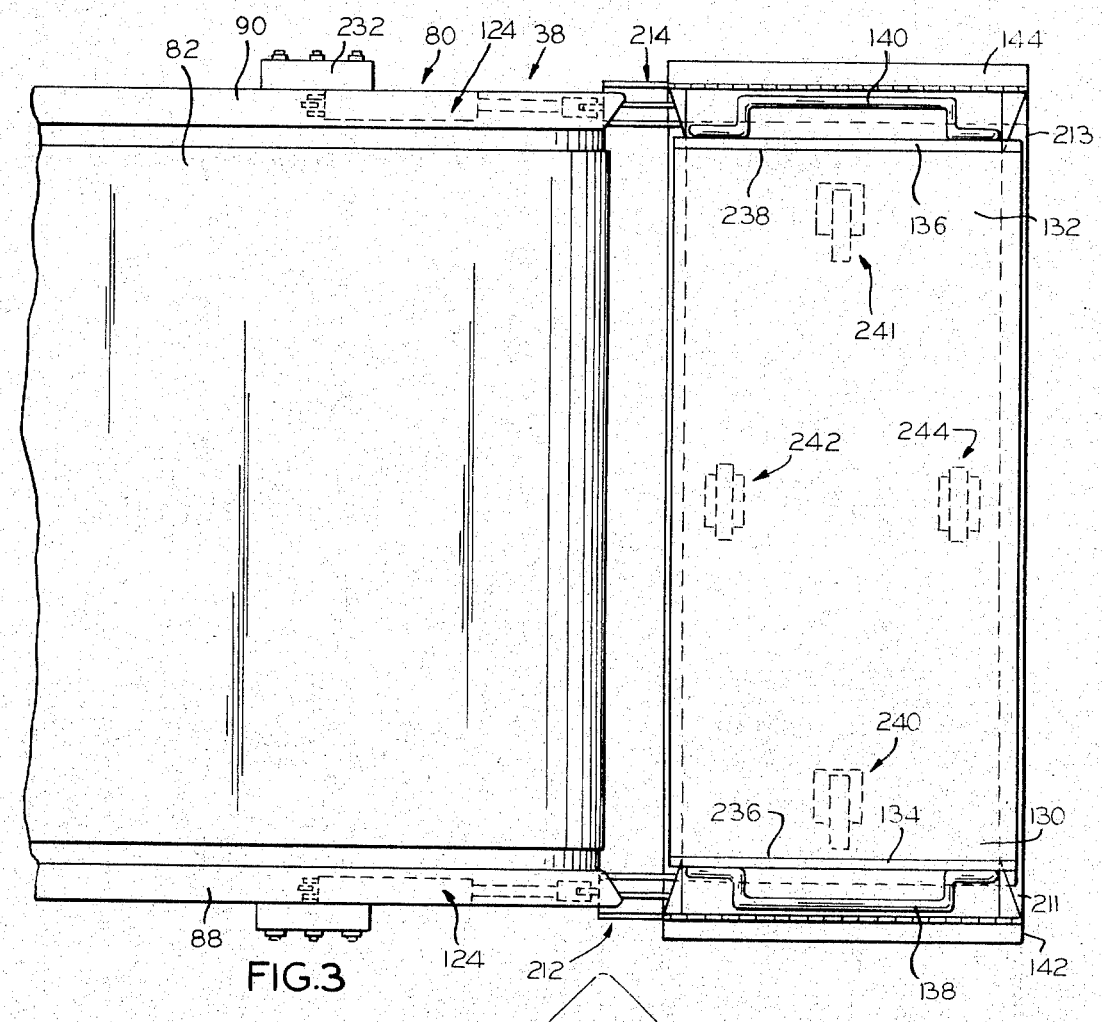
FIG. 3 is a plan view of the arrangement shown in FIG. 2.
Figure 2:
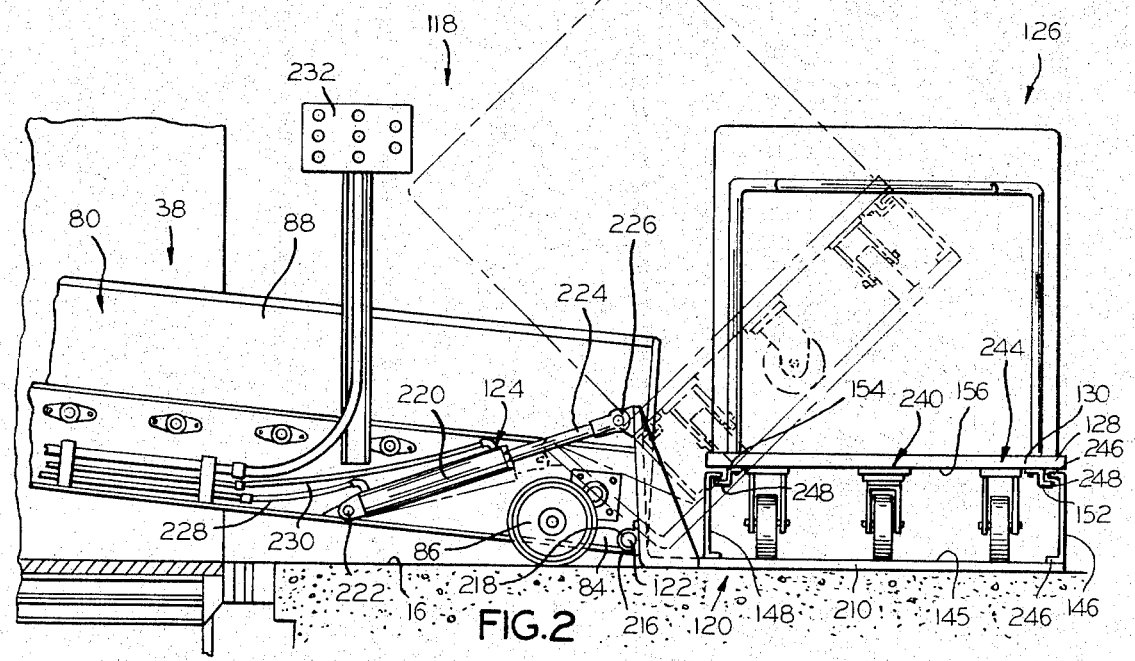
FIG. 2 is a fragmental view similar to that of FIG. 1, but showing the rearward end of the conveyor assembly equipped in accordance with the present invention whereby nutting truck loads may be dumped en mass onto the rearward end of the conveyor assembly.
Figure 5:
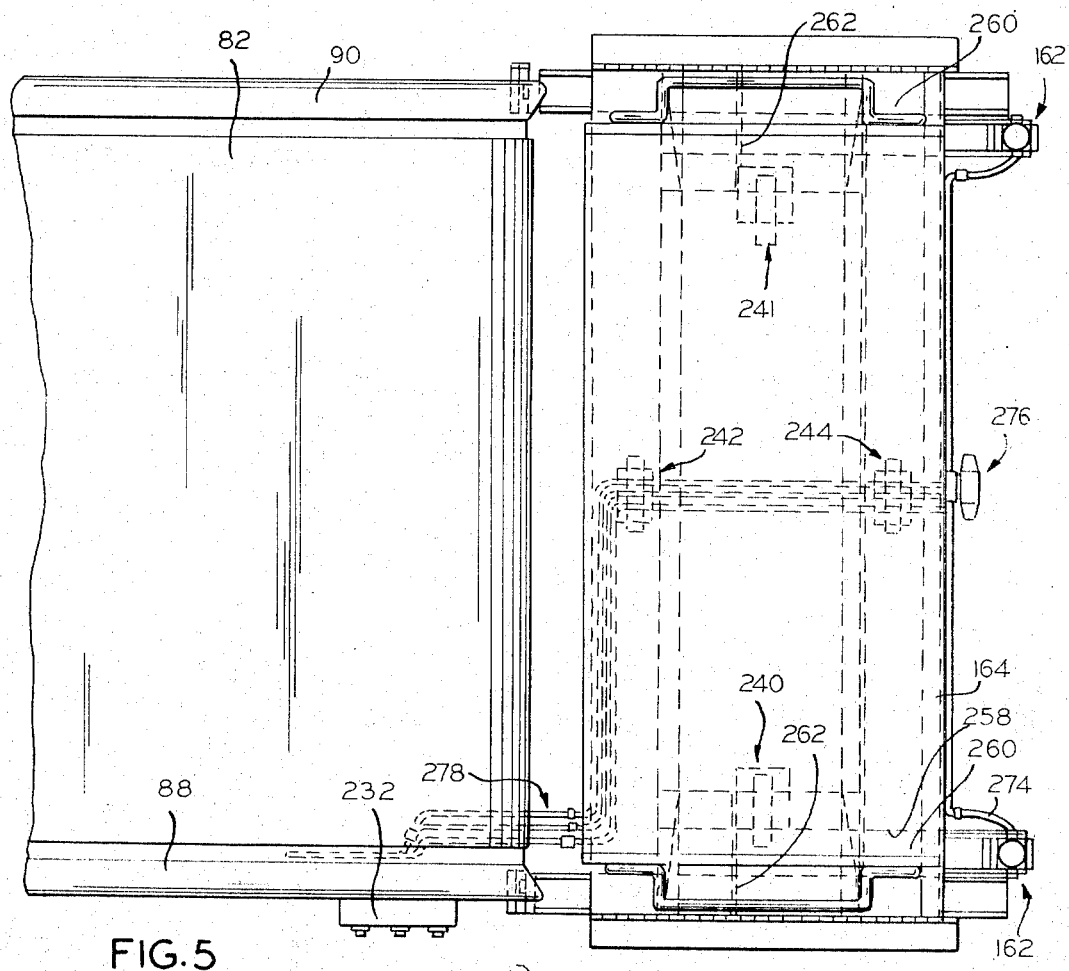
FIG. 5 is a plan view of the arrangement shown in FIG. 4.

In the embodiment 118 of FIGS. 2 and 3, the conveyor 38 has a platform 120 secured to the rearward end 84 of frame 80 for swinging movement about horizontal axis 122 under the action of hydraulic cylinder and piston power devices 124 on either side of the frame 80 and operably interposed between same and platform 120. Platform 120 is oriented to be substantially at the level of the wheel supporting surface 16 of loading platform 12 and receive on same from either end of the platform 20 a special nutting truck 126 comprising the usual wheeled nutting truck body or frame 128 having the ends 130 and 132 of same provided with the respective upstanding planar end walls 134 and 136 formed of smoothed surface plastic or metal sheeting or the like, and suitably affixed to the body 128. The body 128 at its respective ends 130 and 132 also has secured thereto suitable operating handles 138 and 140, respectively.

Platform 120 has its ends 142 and 144 tapered or ramped for smooth entry onto the upper surface 145 of same of the nutting truck 126, and platform 120 has suitably affixed thereto retaining rails 146 and 148 that cooperate with the respective retaining elements 152 and 154 affixed to the underside 156 of the truck body 128 to retain the truck 126 on the platform 120 when the platform 120 is tilted from the full line position of FIG. 2 to the broken line position of the same figure, by operation of power devices 124, to dump the truck load en mass onto the belt 82 of conveyor 38. The mail bags carried on truck 126 extend transversely thereof and as end walls 134 and 136 present low friction engagement with, and some guiding action on, the bags being discharged, the truck bag load readily discharges en mass onto the conveyor belt 82, with the bags being moved forwardly toward conveyor 40 as they engage belt 82.

Figure 4:
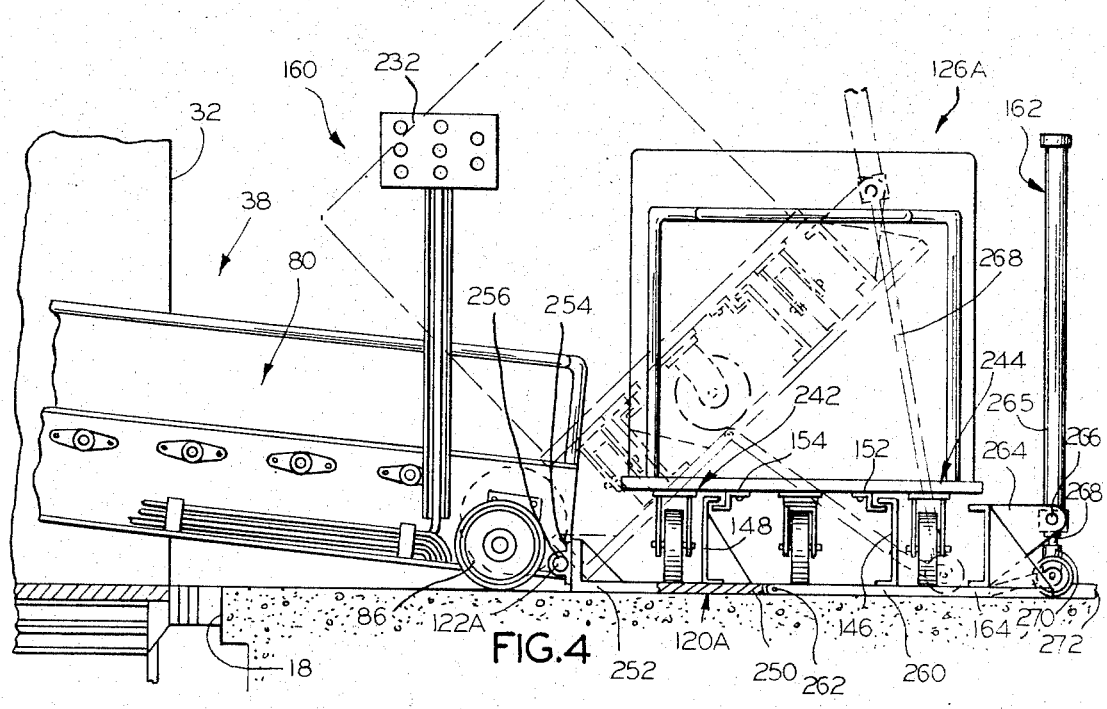
FIG. 4 is a view similar to that of FIG. 2, illustrating a modified form of the invention.

In the embodiment 160 of FIG. 4, the conveyor 38 has a platform 120A secured thereto for swinging movement about horizontal axis 122A by operation of the hydraulic piston and cylinder power devices 162 that are operably associated with the rear edge 164 of the platform 120A. Hand truck 126A is the same as truck 126 except that the retaining tracks 146A and 148A and their associated movement restraining elements 152A and 154A are inwardly of the outer side wheels of the hand truck to avoid entanglement with the bag strings.

when a truck 126A has been applied to the platform 120A, the power devices 162 swing the platform 120A about axis 122A to the broken line position of FIG. 4 to dump the mail bag load of the truck 126A onto the belt 82 of conveyor 38.

Figure 7:
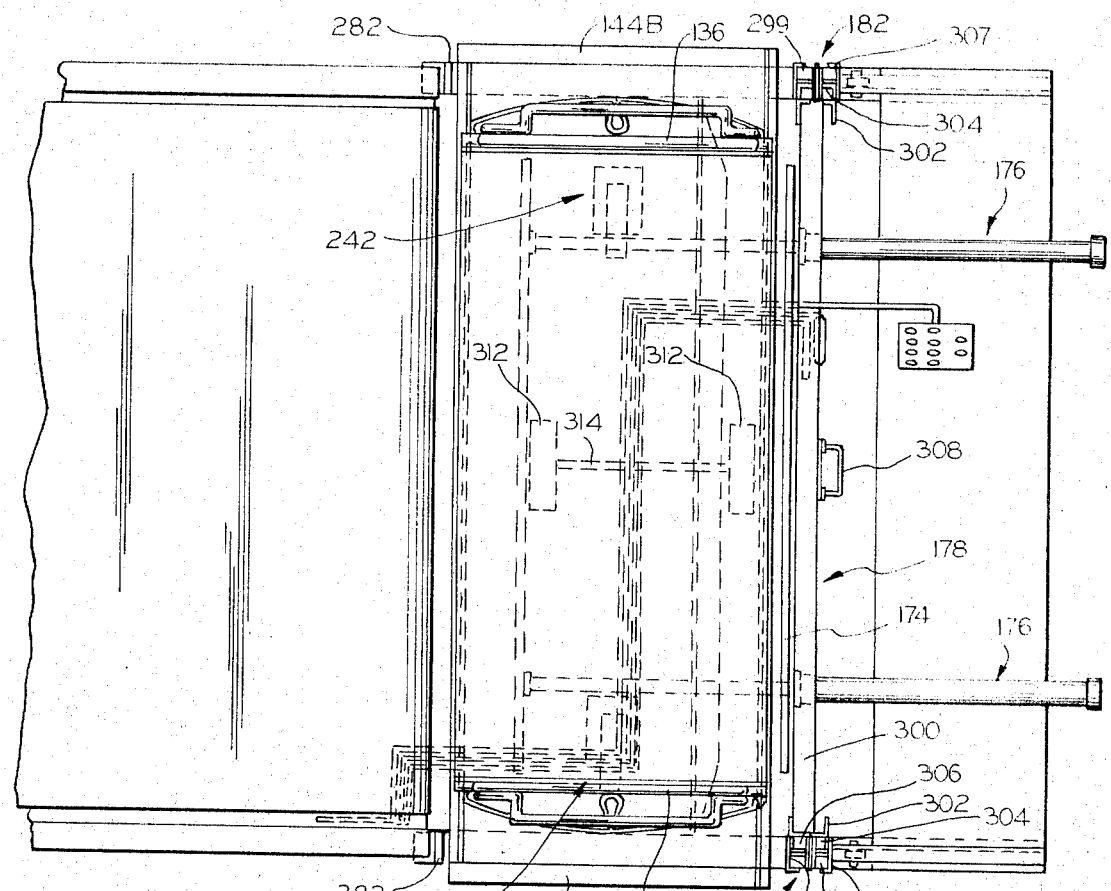
FIG. 7 is a plan view of the arrangement shown in FIG. 6.
Figure 6:
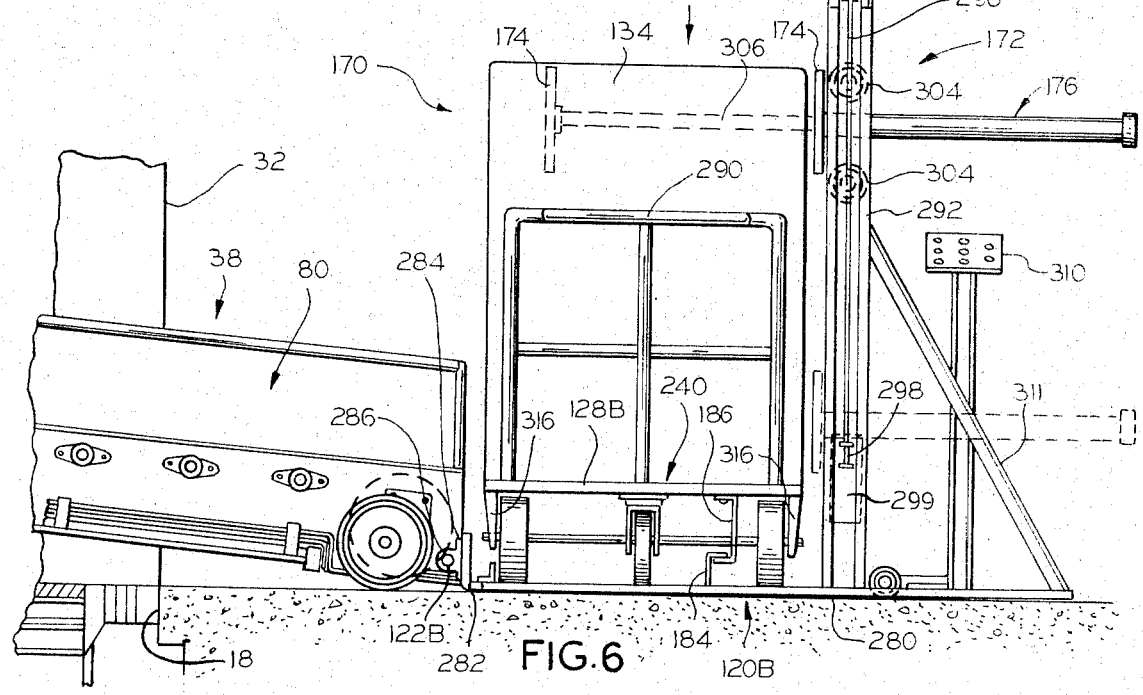
FIG. 6 is a view similar to that of FIGS. 2 and 4 illustrating a further modified form of the invention.

In the embodiment 170 of FIGS. 6 and 7, the platform 120B is secured to the frame 80 for swinging movement about horizontal axis 122B, but for storage purposes only. Platform 124B carries a vertically movable pusher plate assembly 172 including pusher plate 174 and hydraulic cylinder and piston power devices 176 for operating same, mounted on a bridge or carriage 178 operating in spaced apart vertical guide structures 180 and 182 suitably affixed to the platform 120B. Hand truck 126B is similar to hand truck 126 and includes a single movement restraining bracket 184 cooperating with a latch channel 186 affixed to the underside of the nutting truck body 128B.

When the hand truck 126B has been applied to the platform 120B, the carriage 178 is positioned relative to the upper position of the mail bag load, so that the pusher plate 174 is positioned to push off one or more tiers of mail bags onto the conveyor 38. Power devices 176 are operated to achieve this end, whereupon the carriage 178 is lowered to repeat the operation to effect another bag tier discharge onto the conveyor 38, and so on until the load of the nutting truck 126B has been discharged.

In the arrangement shown in FIGS. 8 - 11, the nutting truck unloading apparatus 190 is applied to the rear end of a modified bag loading apparatus which comprises a conveyor 40C that is essentially the same as conveyor 40 (as indicated by corresponding reference numerals), with the conveyor 38 being omitted. The embodiment of FIGS. 8 - 11 is intended to be operated within the vehicle, as distinguished from the other embodiments of the invention, which are disposed on the loading dock 12 for all operating positions of same.

The hand truck unloading apparatus 190 generally comprises a composite platform 120C secured to conveyor apparatus 40C for swinging movement about horizontal axis 122C under the action of hydraulic piston and cylinder power assemblies 192 operably interposed between the platform 120C and the frame 42 of conveyor 40C.

The platform 120C generally comprises a guide assembly 194 that is suitably hinged to the frame 42 to provide the pivotal or swinging action 122C, and a frame 196 mounted in the guide assembly 194 for movement longitudinally thereof on any action of hydraulic piston cylinder assemblies 198. The frame 196 includes a platform member 199 which is disposed at the wheel support level of the wheels of frame 42 when the guide assembly 194 is in its vertically disposed position, and has a ramped rearward edge 200 for facilitating application thereto of the nutting truck 126C. Nutting truck 126C is in the general form of a body 128C having the upstanding end walls 134 and 136, conventional rear wheels 202, and a pair of forward casters 204 whereby the nutting truck 126C may be applied to the platform member 198 in the manner indicated in FIG. 9, within the vehicle 14 for dumping of its load en mass onto the conveyor 40C.

For this purpose, the nutting truck body 128C is provided with a latch arm structure 206 cooperating with a catch member 208 affixed to the platform member 198 to hold the truck 126C against tilting relative to the member 198. Hydraulic piston and cylinder assemblies 198 are operated to first suitably elevate the platform 199 and its hand truck load 126C, and then hydraulic piston and cylinder assemblies 192 are operated to tilt the guide assembly 194 and the load it carries to the broken line position of FIG. 8 for en mass dumping of the nutting truck load onto the conveyor 40C.

SPECIFIC DESCRIPTION

The loading dockk 12 that is illustrated is intended to be representative of conventional loading docks now commonly associated with post office installations or the like.

The vehicle 14 may be of any suitable standard type, that illustrated being intended to represent a typical vehicle now in use in connection with the transportation of bagged mail, though it is to be understood that the invention is equally applicable to other vehicles that are not of the semi-trailer type.

With reference to the nutting truck unloading device 118, the platform 120 comprises a planar member 210 formed from a suitable metallic substance and having the rigidity necessary to accomplish the objects of the invention. Beveled or ramping edges 142 are formed to provide rampways up the platform for application thereto the nutting truck 26.

The platform member 210 at either end 211 and 213 of same has suitably affixed thereto the respective bracket members 212 and 214 which are suitably affixed to the member 210 (as by welding), and each has secured thereto a suitable bearing housing 216 journaling the respective stub shaft elements 218 that are suitably affixed to the conveyor frame 80, whereby the platform member 210 is journaled on the frame 80 for swinging movement about the horizontal axis 122.

The piston and cylinder assemblies 124 each comprise a suitable hydraulic cylinder 220 pivotally connected as at 222 to the frame 80 and operably mounting a hydraulic piston (not shown) from which extends piston rod 224 that is pivotally connected to the respective bracket members 212 and 214 as at 226. The hydraulic piston and cylinder assemblies 124 may be of any conventional type suitably incorporated in hydraulic circuiting that includes supply lines 228 and 230 for supplying hydraulic liquid thereto on command of the operator utilizing a convenient control panel 232 equipped with push button controls for finger tip control purposes.

The nutting truck 126 may be formed of any suitable materials except that the end walls 134 and 136 should be of the type such that their opposing surfaces 236 and 238 are smooth and of low sliding friction characteristics. The undersurface 156 is equipped with suitable end casters 240 and 241, and suitable side casters 242 and 244.

The retaining members 146 and 148 are of channel shaped configuration having their end flanges 246 facing each other, with the upper flanges 246 cooperating with elements 152 and 154, respectively, which are of Z shaped configuration defining latching flanges 248 that are spaced from the undersurface 156 of the nutting truck body 128 to receive the respective upper flanges 246 in vertical movement restraining relation therewith, when the nutting truck is moved onto platform 120.

Nutting trucks 126 may be lined up loaded on the platform 12 for sequential application to the nutting truck unloading arrangement 118 for en mass discharge of the bags 61 carried thereby onto the rear end of the conveyor belt 82 for conveyance to the propelling conveyor 40.

The control panels 232 are duplicated on either side of the conveyor 38 for the convenience of the operator.

In the apparatus 160, the platform 120A comprises a suitable platform member 250 having spaced brackets 250 suitably secured thereto (as by welding) that bear suitable bearing members 254 in which the respective stub shafts 256 that are appropriately secured to the conveyor frame 80 are journaled for swinging the platform 120A about the horizontal axis 122A.

The platform member 120A adjacent either end of same is slotted as at 258 to receive the respective arm members 260 that are pivotally secured thereto as at 262 and bear a suitable bracket structure 264 to which the respective hydraulic cylinders 265 of the respective devices 162 are pivotally connected as at 266. The cylinders 265 respectively mount piston rods 268 each having a ram respectively received in the respective cylinders 265 on one end of same and on the other end of same bearing a clevis member 270 in which roller element 272 is journaled.

The cylinders 265 are supplied with hydraulic pressure liquid through suitable conduits 274 under the control of suitable hand operated four way control valve 276 that is connected by suitable conduiting 278 to the source of hydraulic pressure liquid supply carried by the frame 80. Control panel 232 may be provided for convenience of the operator in controlling conveyors 38 and 40 in this embodiment of the invention.

As indicated in the drawings, when the valve 276 is hand operated to raise platform 120A, after a nutting truck 126A is spplied thereto, the devices 162 operate to swing the platform 128 to the broken line position of FIG. 4 for discharge of the nutting truck load onto the rear end of the conveyor belt 82. Valve 276 is then changed to retract the devices 162 through conduiting that is not shown to return the structure to the full line position of FIG. 4.

In the apparatus 160, the retaining members 146 and 148 are the same as shown in FIG. 2 except that they are located inwardly of the hand truck side casters 242 and 244 for similar cooperation with the respective members 152 and 154, which avoids entanglement with strings of the mail bag being handled. Latching elements 152 and 154 are correspondingly located.

In the embodiment 170 of FIGS. 6 and 7, the platform 120B comprises a platform member 280 having the respective bracket structures 282 applied thereto (as by welding) which mount bearing members 284 in which are journaled the respective stub shafts 286 suitably affixed to the conveyor frame 80 for journaling the platform 120B on the frame 80 for swinging movement about horizontal axis 122B.

The hand truck 126B is similar to hand truck 126A, it being equipped with a modified operating handle structure 290 at either end thereof and the end walls 134 and 136 that have been heretofore described.

The guide assemblies 180 and 182 each comprise an H shaped beam member 292 having a pulley 294 journaled in the upper end of same over which is trained cable 296 having one of its ends 298 connected to counterweight 299 and the other ends of the cables 296 respectively suitably connected to the vertically moving bridge structure 178 that comprises cross member 300 to which the respective piston and cylinder assemblies 176 are suitably applied, and having secured to its respective ends the vertically disposed channel members 302 each of which journals a pair of rollers 304 riding in the respective ways 306 defined by the respective H shaped members 292. The counterweights 299 operate in the respective ways 307 that are also defined by members 292, and collectively counterbalance the weight of the bridge structure 178 and the weight it carries, including the pusher plate 174 that is carried by the respective piston rods 306 of the respective assemblies 176. Bridge structure 178 is provided with a suitable handle grip 308 for manually positioning same relative to platform member 280, and the platform member 280 is provided with suitable control panel 310 for operating piston and cylinder devices 176 when the bridge structure 178 has been appropriately positioned relative to a mail bag load on the nutting truck 126B that is to be discharged onto the conveyor 38. Suitable braces 311 secure members 292 in upright relation.

In the embodiment 170, the nutting truck 126 is equipped with end casters 240 and 242, and side rollers 312 suitably journaled on operating shaft 314 that is in turn mounted in the respective spaced apart body brackets 316.

The nutting truck retainer member 186 is of channel shaped configuration, while the platform latch element 184 is of angle shaped configuration.

The platform 120B is disposed in the position indicated in FIG. 7 with the nutting truck 126B being applied to the platform 120B over its ramped ends 142B and 144B respectively. When the apparatus 10 including the embodiment 170 is to be stored, the platform 120 may be folded over to a vertical position about the axis 122B and suitably secured in place.

In the embodiment 190, the guide assembly 194 comprises a pair of channel members 330 fixed together in spaced relation to base plate 332 on which hydraulic piston and cylinder assemblies 198 are mounted in upright position. The devices 198 each comprise a hydraulic cylinder 334 from which piston rod 336 extends has journaled thereon sheave 338 that has trained over same connector 340 having one of its ends 342 suitably anchored to cross member 344 that is fixed between the respective channel members 330, and the other of its ends 346 suitably anchored to the frame 196, as at 348.

Also fixed between the channel members 330 is cross channel member 350 to which the respective pistons and cylinder devices 192 are respectively pivotally connected. Devices 192 each comprise a suitable hydraulic cylinder 352 pivotally connected to the conveyor frame 62C as at 354, and having operably mounted in same suitable pistons each having a piston rod 355 bearing a clevis element 356 that are pivotally connected to the cross members 350.

The channel members 330 are each equipped with a suitable bearing member 360 in which the respective stub shafts 362 are journaled that are also appropriately journaled in the respective housing members 364 suitably affixed to the conveyor frame 62.

The platform frame 196 comprises the platform member 199 defining ramped rearward edge 200 and having affixed thereto the spaced apart upright members 370 that are each equipped with a pair of guide rollers 372 that are respectively received in the guideways 374 that are defined by the respective guide channels 330. In the form shown, members 370 are suitably affixed to platform member 190 by brace members 374 and 376, and are suitably secured together by brace member 378.

The nutting truck 126C has its body 128C provided with suitable operating handle 380 and the respective end walls 134 and 136. Nutting truck 126C is provided with forward end casters 204 and rearward end wheels 382 journaled on shaft 384 appropriately secured between body brackets 386.

As indicated in FIG. 9, it is intended that the nutting truck 126C when loaded be applied to the platform member 199 by being backed into same in the manner indicated in FIG. 9 and withdrawn when empty.

The latch arm structure 206 for restraining nutting truck 126C from tilting movement relative to platform member 199 comprises a pair of spaced depending arms 390 having a rod member 392 secured therebetween over which hook member 208, that is suitably anchored to platform member 199, is received as the nutting truck 126 is swung into operating position on the platform member 199 in the manner indicated in FIG. 9. Alternately the nutting truck may have its ends suitably releasably secured to platform member 199 while being dumped, by employing any conventional hold down arrangement.

As already indicated, when a loaded hand truck 126C is applied to the platform 199, hydraulic piston and cylinder devices 198 are operated to elevate the platform frame 196 and its nutting truck load relative to the vehicle 430, and then piston and cylinder devices 192 are operated to tilt the guide assembly 194 and the load it carries to the broken line position of FIG. 8 whereby the mail bag load of the nutting truck 126 is dumped en mass onto the conveyors apparatus 40C for loading into the vehicle body 14.

It will therefore be seen that this invention provides several ways of mechanically unloading a loaded nutting truck en mass onto conveyors apparatus of the type described in my said application for rapid loading of vehicles 14. Manual handling of the mail bags and the delays and human effort required in connection therewith is thereby eliminated.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In bulk mail handling apparatus for loading elongated mail bags from a loading dock into the load receiving area of an end loading transport vehicle backed into load receiving position adjacent the dock to dispose its end opening to receive the bags, with said apparatus including a wheeled conveyor assembly adapted to be mounted on the loading dock adjacent the load receiving position of the vehicle and providing conveyor means extending longitudinally thereof that has a width transversely thereof substantially spanning the transverse dimension of the vehicle area when said assembly is received therein, with said conveyor assembly extending longitudinally of said apparatus for alignment with the vehicle and its end opening in the load receiving position of the vehicle and mounted for movement into and out of the vehicle, said conveyor means presenting an upwardly facing load transporting surface defining a path of movement for the mail bags that extends longitudinally of said conveyor assembly between the unloading end of same at the forward end of said assembly and the load receiving end of same at the rearward end of said assembly, a nutting truck unloading device therefor comprising:
a platform secured to the rearward end of said assembly for swinging movement about a horizontal axis between a general horizontal nutting truck receiving position adjacent the level of the wheel support engaging portions of said assembly wheels and extending rearwardly of said assembly rearward end, and an upwardly directed position,
said platform when in its said receiving position being adapted to receive a loaded nutting truck thereon,
means operably associated with said platform for discharging the nutting truck load onto the rearward end of said conveyor means,
and means for releasably securing the nutting truck against tilting movement relative to said platform during operation of said load discharging means.

2. The unloading device set forth in claim 1 including:
power means for upwardly tilting said platform about said axis to said upwardly directed position for gravity discharge of the nutting truck load onto said conveyor means.

3. The unloading device set forth in claim 2 wherein:

said power means comprises hydraulic cylinder and piston assemblies disposed on either side of said assembly and operably connected between said apparatus and said platform for tilting said platform about said axis, and means for extending and retracting said hydraulic assemblies to swing said platform between said positions.

4. The unloading device set forth in claim 2 wherein: said power means comprises hydraulic cylinder and piston assemblies disposed on either side of the rearward end of said platform and operably interposed between said platform and the wheel support surfaces for tilting said platform about said axis;

and means for extending and retracting said hydraulic assemblies to swing said platform between said positions.

5. The unloading device set forth in claim 2 wherein: said platform comprises:

a rectilinear guide assembly hinged to said assembly rearward end for swinging movement about said axis and extending normally of said platform, said platform being mounted in said guide assembly for movement longitudinally of said guide assembly, said power means comprising hydraulic cylinder and piston assemblies disposed adjacent either side of said assembly and operably connected between said apparatus and said platform for swinging said guide assembly about said axis, power means interposed between said guide assembly and said platform for moving said platform relative to said guide assembly from the lower end of said guide assembly and including hydraulic cylinder and piston assembly operably connected therebetween, and means for extending and retracting said hydraulic assemblies to swing said platform between said positions and elevate and lower a nutting truck carried thereby relative to said axis.

6. In bulk mail handling apparatus for loading elongated mail bags from a loading dock into the load receiving area of an end loading transport vehicle backed into load receiving position adjacent the dock to dispose its end opening to receive the bags, with said apparatus including a wheeled conveyor assembly adapted to be mounted on the loading dock adjacent the load receiving position of the vehicle and providing conveyor means extending longitudinally thereof that has a width transversely thereof substantially spanning the transverse dimension of the vehicle area when said assembly is received therein, with said conveyor assembly extending longitudinally of said apparatus for alignment with the vehicle and its end opening in the load receiving position of the vehicle and mounted for movement into and out of the vehicle, said conveyor means presenting an upwardly facing load transporting surface defining a path of movement for the mail bags that extends longitudinally of said conveyor assembly between the unloading end of same at the forward end of said assembly and the load receiving end of same at the rearward end of said assembly, a nutting truck and unloading device therefor comprising, in combination:

a platform secured to the rearward end of said assembly for swinging movement about a horizontal axis between a general horizontal nutting truck receiving position adjacent the level of the wheel support engaging portions of said assembly wheels and extending rearwardly of said assembly rearward end, and an upwardly directed position, said platform when in its said receiving position being adapted to receive a loaded nutting truck thereon, a nutting truck adapted to be received on said platform and comprising a wheeled frame having open side and upstanding spaced apart planar end walls formed by smooth surfaced material between which mail bags are loaded, means operably associated with said platform for discharging the nutting truck load onto the rearward end of said conveyor means, and means for releasably securing the nutting truck against tilting movement relative to said platform during operation of said load discharging means, whereby, when said truck is received on said platform in said load receiving position thereof and said nutting truck discharging means is operated, said truck end walls facilitated discharge of the bag load from said truck.

* * * * *